United States Patent [19]

Williams

[11] Patent Number: 5,190,225
[45] Date of Patent: Mar. 2, 1993

[54] BROADCAST SPREADER APPARATUS

[76] Inventor: Bruce M. Williams, 1568 Gridley, Grand Rapids, Mich. 49504

[21] Appl. No.: 731,898

[22] Filed: Jul. 18, 1991

[51] Int. Cl.⁵ .......................... A01C 15/04; B05B 7/30
[52] U.S. Cl. .................................... 239/653; 239/654; 239/154; 239/578
[58] Field of Search ............... 239/152, 153, 154, 652, 239/653, 654, 578

[56] References Cited

U.S. PATENT DOCUMENTS

| | | | |
|---|---|---|---|
| 244,833 | 7/1881 | Strong, Jr. | 239/652 |
| 337,390 | 3/1886 | Fries | 239/653 |
| 1,469,118 | 9/1923 | Speicher | 239/652 |
| 2,391,048 | 12/1945 | Vose | 239/152 |
| 2,932,127 | 4/1960 | Prance et al. | 239/153 |
| 3,586,238 | 6/1971 | Schmierer et al. | 239/153 |
| 4,600,129 | 7/1986 | Kondo | 239/153 |
| 4,658,778 | 4/1987 | Gamoh et al. | 239/153 |

FOREIGN PATENT DOCUMENTS

| | | | |
|---|---|---|---|
| 51848 | 7/1936 | Denmark | 239/654 |
| 62351 | 3/1937 | Norway | 239/654 |
| 586804 | 4/1947 | United Kingdom | 239/654 |
| 1227612 | 4/1971 | United Kingdom | 239/152 |

Primary Examiner—Andres Kashnikow
Assistant Examiner—Karen B. Merritt
Attorney, Agent, or Firm—Hugh E. Smith

[57] ABSTRACT

An apparatus wherein a blower motor mounted within a housing includes an outlet conduit fixedly mounted to the housing, with a further outlet conduit including a flexible interconnection between the outlet conduit to provide for selective aiming of granular material directed through the conduit structure. A hopper is mounted in operative association with the outlet conduit to include a valve assembly selectively opened by use of a remote cable to direct granular material into a metering tube diametrically directed through the outlet conduit. Harness structure is provided to provide for securement of the organization to a torso portion of an individual.

5 Claims, 4 Drawing Sheets

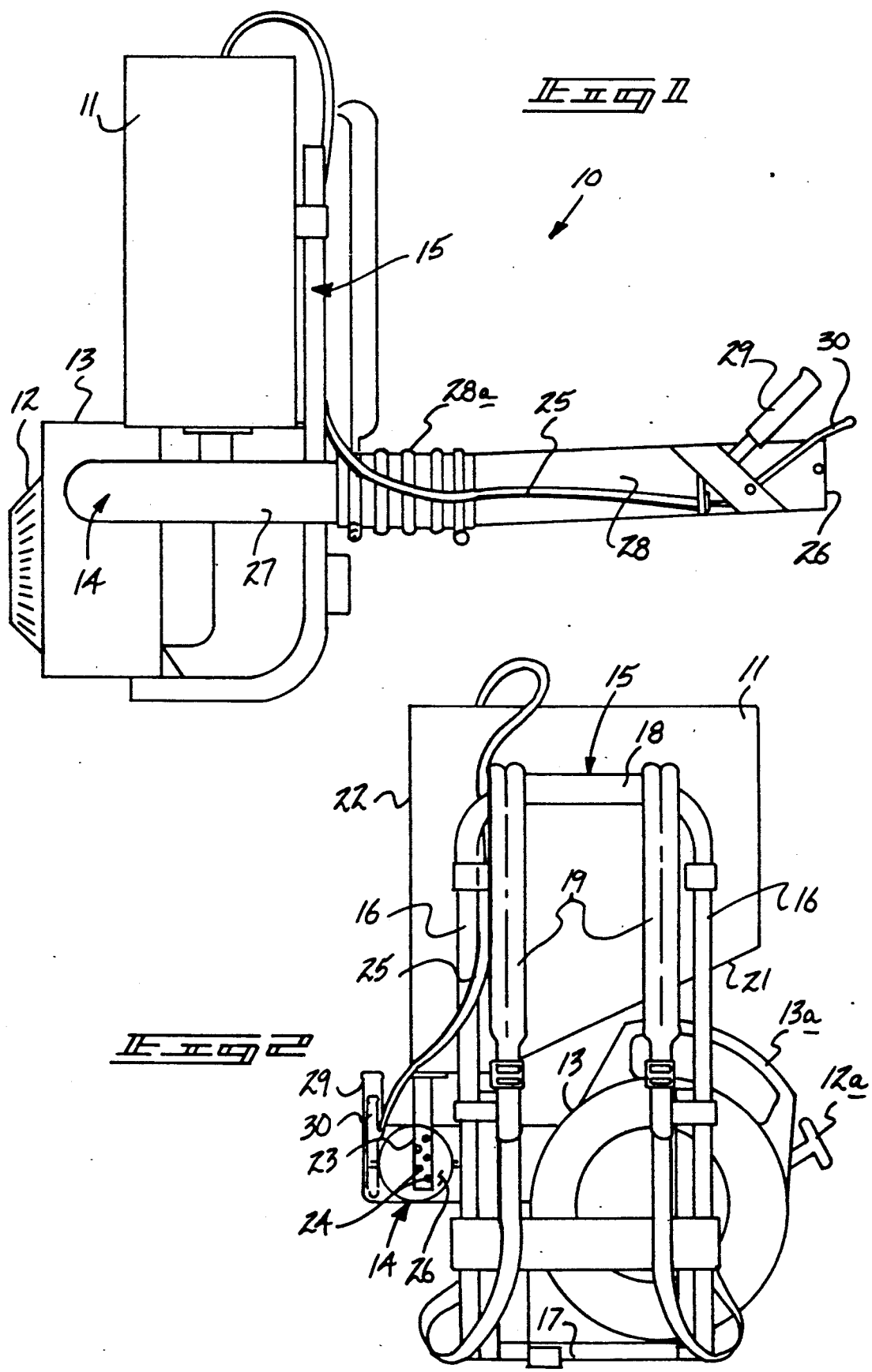

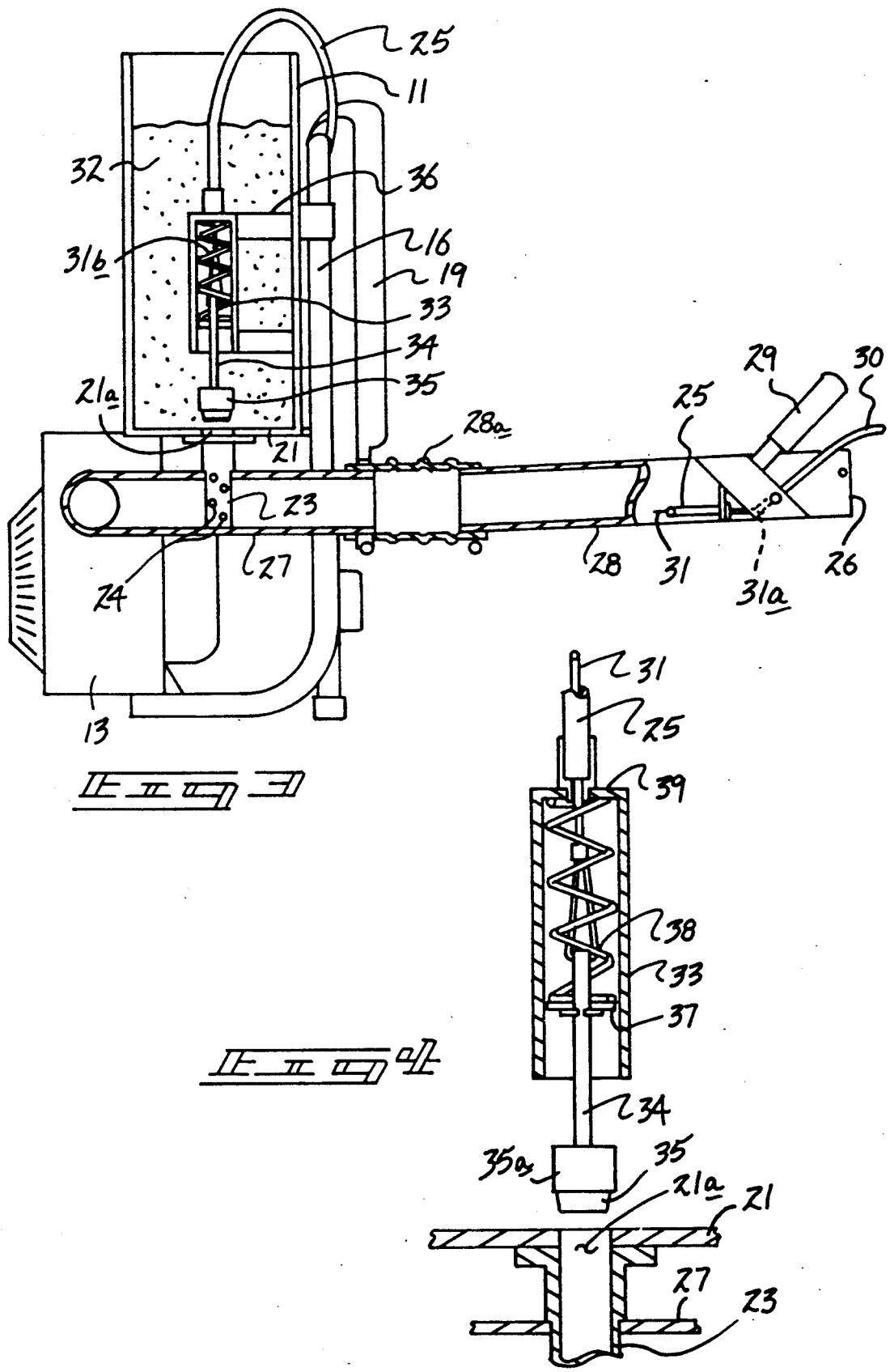

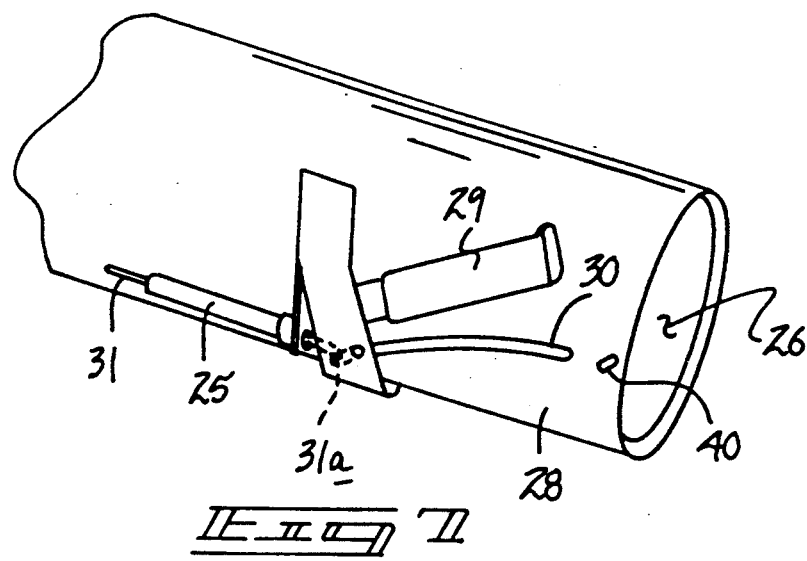
FIG. 7
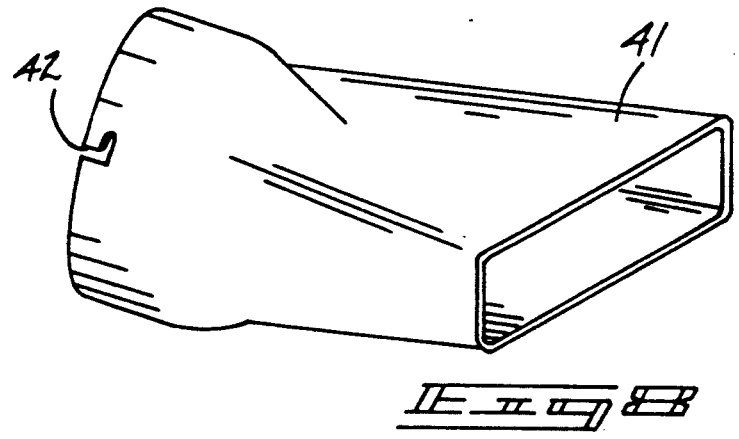
FIG. 8
FIG. 9
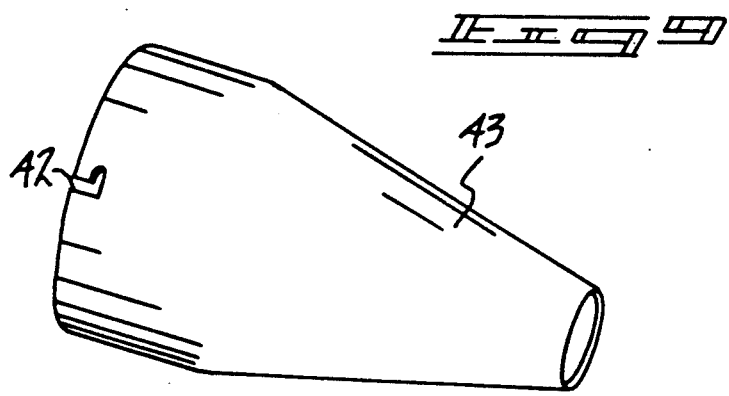

BROADCAST SPREADER APPARATUS

BACKGROUND OF THE INVENTION

1. Field of the Invention

The field of invention relates to spreader apparatus, and more particularly pertains to a new and improved broadcast spreader apparatus wherein the same is arranged for dispensing and spreading dry granular material, such as seed, fertilizer, and the like.

2. Description of the Prior Art

Proper dispersion of granular material is necessary for efficiency in use of material to be dispersed, as well as for proper density in dispersion of the material. Providing a velocity to granular material to be spread is desirable to ensure its proper dispersion and to negate various environmental conditions such as wind and the like during a dispersing procedure. Prior art apparatus for use in broadcasting material is typified in U.S. Pat. No. 3,135,517 to Klema wherein a broadcast spreader utilizes a crank member that is rotated to project material from an outlet relative to the spreader apparatus.

U.S. Pat. No. 2,514,962 to McElhatton sets forth a portable spreader apparatus typically utilizing a cylindrical housing directing granular material through a slotted aperture by a mechanical crank drive.

U.S. Pat. No. 3,979,071 to Biggs, Jr. sets forth a further example of a granular dispersing material utilizing a turning wheel operative through a crank driven impeller structure.

As such, it may be appreciated that there continues to be a need for a new and improved broadcast spreader apparatus as set forth by the instant invention which addresses both the problems of ease of use as well as effectiveness in construction in directing granular material in a various pattern utilizing a pneumatic conduit to direct the granular material.

SUMMARY OF THE INVENTION

In view of the foregoing disadvantages inherent in the known types of spreader apparatus now present in the prior art, the present invention provides a broadcast spreader apparatus wherein the same utilizes pneumatic pressure directing granular material from a hopper through a venturi conduit within the outlet conduit. As such, the general purpose of the present invention, which will be described subsequently in greater detail, is to provide a new and improved broadcast spreader apparatus which has all the advantages of the prior art spreader apparatus and none of the disadvantages.

To attain this, the present invention provides an apparatus wherein a blower motor mounted within a housing includes an outlet conduit fixedly mounted to the housing, with a further outlet conduit including a flexible interconnection between the outlet conduit to provide for selective aiming of granular material directed through the conduit structure. A hopper is mounted in operative association with the outlet conduit to include a valve assembly selectively opened by use of a remote cable to direct granular material into a metering tube diametrically directed through the outlet conduit. Harness structure is provided to provide for securement of the organization to a torso portion of an individual.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved broadcast spreader apparatus which has all the advantages of the prior art spreader apparatus and none of the disadvantages.

It is another object of the present invention to provide a new and improved broadcast spreader apparatus which may be easily and efficiently manufactured and marketed.

It is a further object of the present invention to provide a new and improved broadcast spreader apparatus which is of a durable and reliable construction.

An even further object of the present invention is to provide a new and improved broadcast spreader apparatus which is susceptible of a low cost of manufacture with regard to both materials and labor, and which accordingly is then susceptible of low prices of sale to the consuming public, thereby making such broadcast spreader apparatus economically available to the buying public.

Still yet another object of the present invention is to provide a new and improved broadcast spreader apparatus which provides in the apparatuses and methods of the prior art some of the advantages thereof, while simultaneously overcoming some of the disadvantages normally associated therewith.

These together with othe objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view of the instant invention.

FIG. 2 is an orthographic frontal view of the instant invention.

FIG. 3 is an orthographic side view, partially in section, of the instant invention.

FIG. 4 is an enlarged cross-sectional illustration of the valve structure utilized by the instant invention.

FIG. 7 is an isometric enlarged view of the lead conduit second leg mounting the actuator handle.

FIG. 8 is an isometric illustration of an attachable broadcast head.

FIG. 9 is an isometric illustration of a further broadcast head mounted to the exit opening of the second leg.

DESCRIPTION OF THE PREFERRED EMBODIMENT

Figure 5:
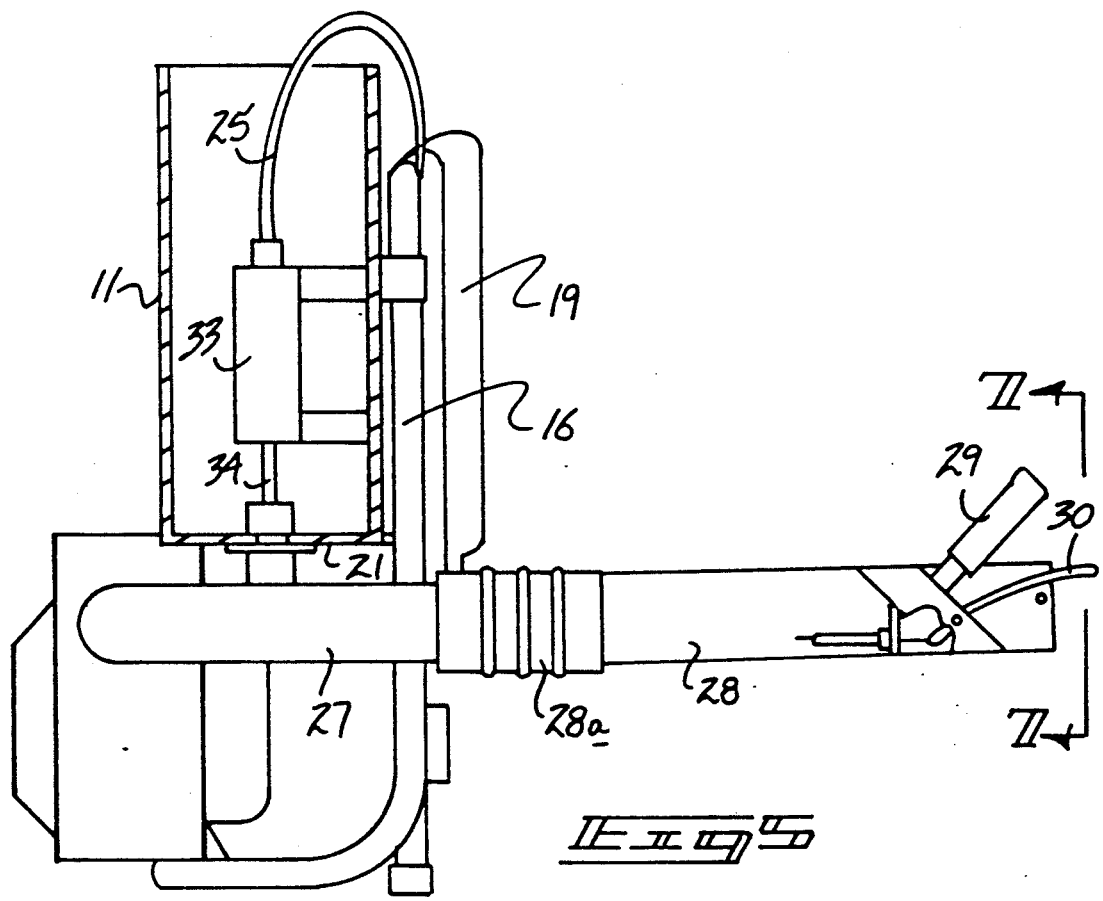
FIG. 5 is an orthographic side view, partially in section, illustrating the valve in a closed position.

With reference now to the drawings, and in particular to FIGS. 1 to 9 thereof, a new and improved broadcast spreader apparatus embodying the principles and concepts of the present invention and generally designated by the reference numeral 10 will be described.

More specifically, the broadcast spreader apparatus 10 of the instant invention essentially comprises a vertically oriented hopper 11, including a blower motor 12 positioned adjacent to and below the hopper, with the blower motor 12 mounted within a blower housing 13. The blower housing 13 includes a housing handle 13a (see FIG. 2) for ease of transport of the apparatus, with a feed conduit in pneumatic communication with the blower housing, with the feed conduit 14 projecting forwardly of the hopper 11. A support framework 15 is provided to include a plurality of spaced parallel vertical bars 16 fixedly mounted to a forward wall of the hopper 11, with a lower frame bar 17 spaced from and parallel a top frame bar 18. A plurality of shoulder straps 19 are arranged substantially parallel to the vertical bars 16 positioned interiorly of the vertical bars 16 for securement of the apparatus to a torso portion of an individual for ease of transport and use of the apparatus. In this manner, the feed conduit 14 includes a feed conduit rigid tubular first leg 27 in pneumatic communication with the blower housing 13 oriented orthogonally relative to the vertical bars 16 projecting forwardly of the forward wall of the hopper housing 11, with a feed conduit rigid second leg 28 in pneumatic communication with the first leg 27 by a flexible tubular junction tube 28a.

The hopper 11 includes an inclined hopper bottom wall 21 defining an acute included angle between the hopper bottom wall 21 and a hopper left side wall 22 positioned in an overlying relationship relative to the tubular first leg 27. A bottom wall opening 21a is positioned at an intersection of the bottom wall 21 and the left side wall 22 to include a material metering conduit 23 directing granular material 32 from interiorly of the hopper through the bottom wall opening 21a and the material metering conduit 23 that projects diametrically through the rigid tubular first leg 27 and includes a matrix of metering conduit apertures 24 directed therethrough, wherein metering of granular material directed into the conduit 23 is projected exteriorly of a conduit exit opening 26 of the second leg 28 in broadcasting the material exteriorly in a desired pattern. To this end, a fixed handle 29 is fixedly mounted to the second leg 28 adjacent the exit opening 26, with a pivoted lever 30 mounted adjacent the fixed handle 29 to permit directing the pivot lever 30 towards the fixed handle 29. A valve cable 31 is provided contained within a valve cable sheath 25. A first end 31a of the valve cable 31 is mounted to a lower terminal end of the pivot lever 30, with a second end 31b of the valve cable mounted to a valve rod 34 interiorly of the hopper 11. The cylindrical valve housing 33 is mounted interiorly of the hopper 11 by a plurality of valve housing support straps 36 to position and orient the cylindrical valve housing 33 in coaxial alignment with the bottom wall opening 21a. The valve rod 34 coaxially aligned and reciprocatably mounted within the cylindrical valve housing 33 includes a conical plug head 35 mounted at a lower terminal end thereof receivable within the bottom wall opening 21a, with the conical plug head 35 mounted to a support cylinder 35a that in turn is coaxially mounted to a lower terminal end of the valve rod 34. The upper terminal end of the valve rod 34 is mounted to the valve cable second end 31b. A lower spring plate 37 is fixedly mounted about the valve rod 34 spaced from its upper terminal end, wherein a spring member 38 is captured between the spring plate 37 and a valve housing top wall 39, with the valve cable 31 and the valve cable second end 31b projecting medially of the valve housing top wall 39 into the valve housing.

Figure 6:
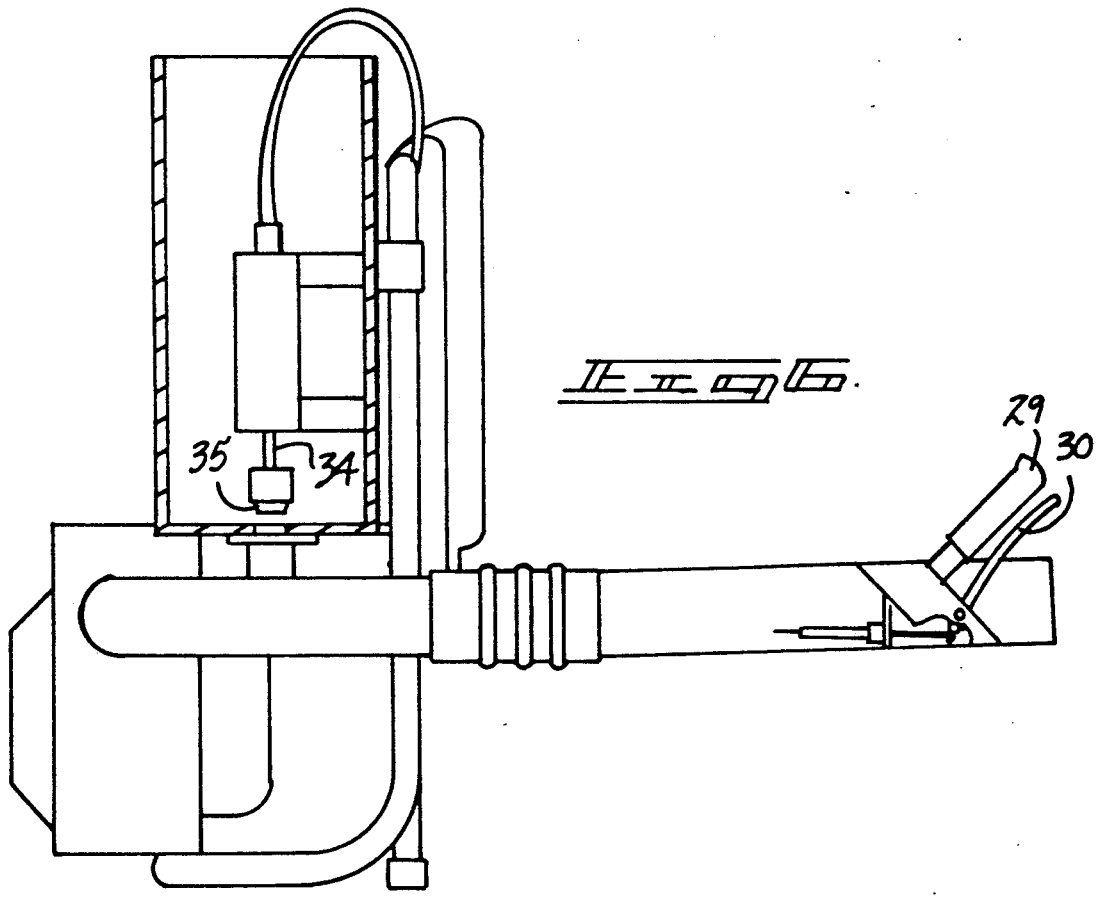
FIG. 6 is an orthographic side view, partially in section, illustrating the valve in a raised opened position.

In this manner as illustrated in sequential operation of FIGS. 5 and 6, compression of the pivot lever 30 relative to the fixed handle 29 effects displacement of the plug head 35 relative to the bottom wall opening 21a permitting granular material 32 to be directed into the material housing conduit and then project exteriorly of the tubular first and second legs 27 and 28 respectively as the material is projected by a venturi effect through the material metering conduit apertures 24.

A pin projection 40 is fixedly mounted adjacent the conduit exit opening 26 of the tubular second leg 28 for reception with an "L" shaped groove 42 of respective first and second broadcast heads 41 and 43. The broadcast heads 41 and 43 each include a cylindrical rear entrance to complementarily receive the conduit exit opening 26 therewithin, and each are defined by narrowed exit openings, wherein the first head 41 includes a rectangular opening and the second head includes an annular opening, wherein the annular opening is defined by a second diameter less than the first diameter defined by the exit opening 26. The rectangular opening further defines a restricted opening to permit increased velocity of the granular material as projected therethrough, in both the case of the exit openings of the first and second heads 41 and 43 to provide various patterns in the directing and spray of the granular material 32 from the exit opening 26.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A broadcast spreader apparatus, comprising,
    a vertically aligned hopper, the hopper including a hopper forward wall, a hopper bottom wall, and a plurality of side walls, the side walls including a left side wall, and
    the hopper bottom wall defining an acute included angle between the left side wall and the bottom wall, and
    the hopper including a bottom wall opening directed through the bottom wall at a junction defined by an intersection of the left side wall and the bottom wall, and
    a blower motor, the blower motor mounted within a blower housing, and the blower housing including feed conduit to direct pneumatic pressure through the feed conduit from the blower housing, and
    valve means positioned within the hopper for directing selective flow of granular material through the bottom wall opening, and
    the feed conduit includes a rigid tubular first leg in pneumatic communication with the blower housing, with the rigid tubular first leg positioned below the hopper and below the junction, and the feed conduit including a tubular second leg, with the tubular second leg in pneumatic communication with the tubular first leg to include a flexible tubular junction to permit pivotment of the tubular second leg relative to the tubular first leg, and
    a material metering conduit, the metering conduit mounted in communication interiorly of the hopper through the bottom wall opening and projecting diametrically through the tubular first leg, the metering conduit including a matrix of apertures directed therethrough to direct granular material from the hopper through the metering conduit and the apertures.

2. An apparatus as set forth in claim 1 including a support framework, the support framework including a plurality of spaced parallel vertical bars mounted to the hopper forward wall, the vertical bars including a bottom frame bar and a top frame bar, and a plurality of spaced shoulder straps mounted between the top frame bar and the bottom frame bar adjacent the vertical frame bars for securement of the shoulder straps about a torso portion of an individual.

3. An apparatus as set forth in claim 2 wherein the valve means includes a conical plug head coaxially aligned relative to the bottom wall opening, the plug head fixedly and coaxially mounting a valve rod, the valve rod reciprocatably and coaxially mounted within a cylindrical valve housing, the cylindrical valve housing including at least one support strap mounted fixedly to the housing and interiorly of the hopper to coaxially align the cylindrical valve housing with the bottom wall opening.

4. An apparatus as set forth in claim 3 wherein the cylindrical valve housing includes a cylindrical valve housing top wall, and the top wall including an opening coaxially aligned with the cylindrical valve housing, and the valve rod coaxially aligned with the opening, and the valve rod including a lower spring plate fixedly mounted to the valve rod, and a spring member captured between the lower spring plate and the valve housing top wall, and a valve cable directed through the opening and fixedly secured to an upper terminal end of the valve rod, and the valve cable directed exteriorly of the hopper and positioned adjacent a free terminal end of the tubular second leg of the feed conduit, the valve cable including a valve cable forward end, and a pivoted lever mounted to the tubular second leg adjacent a tubular second leg exit opening, wherein the pivot lever includes the valve cable forward end mounted thereto, and a fixed handle positioned adjacent the pivoted handle, and the valve rod reciprocated interiorly of the valve housing upon pivoting of the pivoted lever towards the fixed handle, and the valve rod extended exteriorly and biased exteriorly of the cylindrical valve housing upon pivotment of the pivoted lever in a spaced relationship relative to the fixed handle.

5. An apparatus as set forth in claim 4 wherein the tubular second leg includes a pin projection mounted to the tubular second leg adjacent the exit opening, and a plurality of broadcast head members to be selectively mounted about the exit opening, wherein each broadcast head includes a cylindrical entrance opening complementarily receiving the tubular second leg exit opening, and the entrance opening including an "L" shaped groove directed through the broadcast head adjacent the entrance opening for selective securement of each broadcast head relative to the tubular second leg.

* * * * *